United States Patent
Schwartz et al.

[19]

[11] Patent Number: 5,808,455
[45] Date of Patent: Sep. 15, 1998

[54] DC-TO-DC CONVERTER HAVING HYSTERETIC CURRENT LIMITING

[75] Inventors: Peter Hamlin Schwartz, Mountain View; Zhong Yuan Ren, Cupertino, both of Calif.

[73] Assignee: Micro Linear Corporation, San Jose, Calif.

[21] Appl. No.: 748,678

[22] Filed: Nov. 13, 1996

[51] Int. Cl.$^6$ ..................................... G05F 1/59
[52] U.S. Cl. ..................... 323/271; 323/283; 323/285
[58] Field of Search .................................. 323/271, 282, 323/283, 284, 285

[56] References Cited

U.S. PATENT DOCUMENTS

| | | | |
|---|---|---|---|
| 3,294,981 | 12/1966 | Bose | 307/88.5 |
| 3,603,809 | 9/1971 | Uchiyama | 307/228 |
| 3,660,753 | 5/1972 | Judd et al. | 323/22 T |
| 3,883,756 | 5/1975 | Dragon | 307/265 |
| 4,392,103 | 7/1983 | O'Sullivan et al. | 323/222 |
| 4,407,588 | 10/1983 | Arichi et al. | 368/118 |
| 4,437,146 | 3/1984 | Carpenter | 363/21 |
| 4,456,872 | 6/1984 | Froeschle | 323/286 |
| 4,529,927 | 7/1985 | O'Sullivan et al. | 323/222 |
| 4,651,231 | 3/1987 | Douglas, Jr. | 358/342 |
| 4,672,303 | 6/1987 | Newton | 323/285 |
| 4,672,518 | 6/1987 | Murdock | 363/21 |
| 4,677,366 | 6/1987 | Wilkinson et al. | 323/222 |
| 4,691,159 | 9/1987 | Ahrens et al. | 323/222 |

(List continued on next page.)

FOREIGN PATENT DOCUMENTS 60-22490  2/1985  Japan ............................... H02P 5/41

OTHER PUBLICATIONS

"Nonlinear–Carrier Control for High Power Factor Rectifiers Based On Flyback, Cuk, or Sepic Converters," R. Zane and D. Maksimovic, Applied Power Electronics Conf., pp. 814–820, 1996.

"Nonlinear–Carrier Control for High Power Factor Boost Rectifiers," D. Maksimovic, Y. Jang, and R. Erickson, Applied Power Electronics Conf., pp. 635–641, 1995.

"ML4863 High Efficiency Flyback Controller", Micro Linear Corporation, pp. 1–8, Feb. 1995 (Preliminary).

"ML4863EVAL User's Guide High Efficiency Flyback Controller", Micro Linear Corporation, pp. 1–5, Feb. 1995.

"Off–Line And One–Cell IC Converters Up Efficiency," Frank Goodenough, Electronic Design, pp. 55–56, 58, 60, 62–64, Jun. 27, 1994.

(List continued on next page.)

Primary Examiner—Jeffrey L. Sterrett
Attorney, Agent, or Firm—Haverstock & Associates

[57] ABSTRACT

A DC-to-DC converter having hysteretic inductor current limiting and that does not have a resistor continuously carrying the inductor current. A voltage supply is coupled to a drain of a first transistor. A source of the first transistor is coupled to a first terminal of the inductor and to a drain of a second transistor. A source of the second transistor is coupled to ground through a resistor. A second terminal of the inductor is coupled to a first terminal of a capacitor. When the first transistor is on, the second transistor is off, causing current in the inductor to increase. The current flowing through the inductor charges the capacitor, and stores energy in the inductor as an increasing magnetic field. When the first transistor is off, the second transistor is on, and the stored energy is converted back into current, continuing to charge the capacitor. Voltage across the capacitor is regulated for powering a load by controlling the first and second transistors in a feedback loop. When the first transistor is off and the second transistor is on, a voltage across the resistor in series with the second transistor forms a signal representative of the inductor current. When the inductor current is higher than a first threshold at the start of a discharge cycle, the discharge cycle is extended until the inductor current falls below a second threshold, lower than the first threshold. Thus, the inductor current is hysteretically limited to prevent excessive current from damaging circuit elements.

27 Claims, 7 Drawing Sheets

U.S. PATENT DOCUMENTS

| | | | |
|---|---|---|---|
| 4,731,574 | 3/1988 | Melbert | 323/275 |
| 4,736,151 | 4/1988 | Dishner | 323/224 |
| 4,761,725 | 8/1988 | Henze | 363/46 |
| 4,841,220 | 6/1989 | Tabisz et al. | 323/282 |
| 4,920,309 | 4/1990 | Szepesi | 323/269 |
| 4,929,882 | 5/1990 | Szepesi | 323/222 |
| 4,941,080 | 7/1990 | Sieborger | 363/127 |
| 4,947,309 | 8/1990 | Jonsson | 323/285 |
| 4,975,823 | 12/1990 | Rilly et al. | 363/56 |
| 5,028,861 | 7/1991 | Pace et al. | 323/222 |
| 5,034,873 | 7/1991 | Feldtkeller | 363/21 |
| 5,138,249 | 8/1992 | Capel | 323/283 |
| 5,146,399 | 9/1992 | Gucyski | 363/89 |
| 5,278,490 | 1/1994 | Smedley | 323/284 |
| 5,359,281 | 10/1994 | Barrow et al. | 323/284 |
| 5,412,308 | 5/1995 | Brown | 323/267 |
| 5,414,341 | 5/1995 | Brown | 323/285 |
| 5,434,767 | 7/1995 | Batarseh et al. | 363/16 |
| 5,440,473 | 8/1995 | Ishii et al. | 363/21 |
| 5,457,621 | 10/1995 | Munday et al. | 363/56 |
| 5,457,622 | 10/1995 | Arakawa | 363/59 |
| 5,461,302 | 10/1995 | Garcia et al. | 323/222 |
| 5,479,089 | 12/1995 | Lee | 323/282 |
| 5,485,361 | 1/1996 | Sokal | 363/21 |
| 5,491,445 | 2/1996 | Moller et al. | 327/540 |
| 5,502,370 | 3/1996 | Hall et al. | 323/284 |
| 5,532,577 | 7/1996 | Doluca | 323/282 |
| 5,552,695 | 9/1996 | Schwartz | 323/271 |
| 5,565,761 | 10/1996 | Hwang | 323/222 |
| 5,568,041 | 10/1996 | Hesterman | 323/207 |
| 5,592,071 | 1/1997 | Brown | 323/282 |
| 5,592,128 | 1/1997 | Hwang | 331/61 |
| 5,617,306 | 4/1997 | Lai et al. | 323/284 |
| 5,627,460 | 5/1997 | Bazinet et al. | 323/284 |

OTHER PUBLICATIONS

"Designing with hysteretic current–mode control," Gedaly Levin and Kieran O'Malley, Cherry Semiconductor Corp., EDN, pp. 95–96, 98, 100–102, Apr. 28, 1994.

"Analysis of the Flyback Converter Operating in Current–Mode Pulse–Frequency Modulation," Urs Mader and K. Kit Sum, High Frequency Power Conversion, Apr. 17, 1994.

"Step–Up/Step–Down Converters Power Small Portable Systems," Bruce D. Moore, EDN, pp. 79–82, 84, Feb. 3, 1994.

"ML4861 Low Voltage Boost Regulator," Micro Linear Corporation, Jun. 1993.

"11. Variable Frequency Converters," K. Kit Sum, pp. 96–97, 135–135, 1993.

"3.3V/5V/Adjustable Output, Step–Up, DC–DC Converters," Maxim Integrated Products, pp. 1–8, Jun. 1993.

"ML4821 Power Factor Controller," Micro Linear Corporation, pp. 6–119 to 6–126, Jun. 1992 (Preliminary).

"ML4821EVAL Average Current PFC Controller Evaluation Kit," Micro Linear Corporation, p. 6–127, Jul. 1992.

"ML4821 Power Factor Controller," Micro Linear Corporation, pp. 1–12, May 1997.

"Application Note 16—Theory and Application of the ML4821 Average Current Mode PFC Controller," Micro Linear Corporation, pp. 10–102 to 10–119, Jan. 1992.

"Small–Signal High–Frequency Analysis Of The Free–Running Current–Mode–Controlled Converter," Richard Redl, pp. 897–906, IEEE, 1991.

"Low–Voltage–Input, 3V/3.3V/5V/Adjustable–Output, Step–Up DC–DC Converters," Maxim Integrated Products, pp. 4–189 to 4–191 (no date).

"LT1073 Micropower DC–DC Converter Adjustable and Fixed 5V, 12V" Linear Technology, pp. 4–174 to 4–189, 4–192, (no date).

"Application Note 30," Linear Technology, p. AN30–42, (no date).

"System–Engineered Portable Power Supplies Marry Improved Efficiency And Lower Cost," Bruce D. Moore, Maxim Integrated Products (no date).

"ML4823 High Frequency Power Supply Controller," Micro Linear Corporation, pp. 1–8, Dec. 1994 (Preliminary).

"CD54/74HC 4046A, CD54/74HCT 4046A Technical Data," File No. 1854, RCA, (no date).

"ML4863 High Efficiency Battery Pack Converter," Micro Linear Corporation, p. 1, Jun. 1994 (Preliminary).

"ML4880 Portable PC/PCMCIA Power Controller," Micro Linear Corporation, p. 1, Oct. 1995 (Preliminary).

DC-TO-DC CONVERTER HAVING HYSTERETIC CURRENT LIMITING

FIELD OF THE INVENTION

The invention relates to the field of DC-to-DC converters. In particular, the invention relates to the field of DC-to-DC converters having hysteretic current limiting and that do not utilize a sensing resistor in series with the inductor.

BACKGROUND OF THE INVENTION

FIG. 1 illustrates a schematic diagram of a power stage of a DC-to-DC converter of the prior art. A voltage supply Vin is applied to a first terminal of a switch S. A second terminal of the switch S is coupled to a cathode of a diode D and to a first terminal of an inductor L. An anode of the diode D is coupled to a ground node. A second terminal of the inductor L is coupled to a first terminal of a resistor R. A second terminal of the resistor R is coupled to a first terminal of a capacitor C and forms an output voltage Vout. A second terminal of the capacitor C is coupled to the ground node.

A control circuit (not shown) generates a signal Vcontrol for controlling the switch S. When the switch S is turned on (closed), the input voltage Vin is applied to the first terminal of the inductor L causing current in the inductor L to increase in amplitude. This current flowing through the inductor L simultaneously charges the output capacitor C, and stores energy in the inductor L as an increasing magnetic field strength. When the switch S is turned off (opened), the energy stored in the magnetic field of the inductor L is converted back into current. The energy stored in the magnetic field of the inductor L continues to charge the capacitor C until either the cycle is repeated or the energy stored in the inductor L is depleted. The current through the capacitor C is a difference between the current through the inductor L and a current drawn by a load coupled to the output voltage Vout. Since $dV/dt = dI/C$, it can be seen that the capacitor C will act to smooth any resulting ripple in the output voltage Vout.

The switch S is controlled with feedback to maintain the output voltage Vout at a constant level. In certain applications, it may be necessary to sense the inductor current I1. This is accomplished by sensing a voltage Vs across the resistor R in series with the inductor L. The value of the sensing resistor R, however, should be tightly controlled for sensing the inductor current I1 accurately and must be capable of dissipating a relatively large amount of power because all the current to the load passes through the resistor R. This power dissipation in the resistor R has a detrimental effect upon the efficiency of the DC-to-DC converter. For example, in applications that utilize a battery for the supply Vin, a substantial amount of the battery power may be dissipated in the resistor R. For these reasons, what is needed is a technique for sensing the inductor current without utilizing a sensing resistor which is continuously carrying the inductor current.

SUMMARY OF THE INVENTION

The invention is a DC-to-DC converter including hysteretic inductor current limiting that does not utilize a resistor in series with the inductor for sensing the inductor current. A voltage supply, such as a battery, is coupled to a drain of a first transistor. A source of the first transistor is coupled to a first terminal of the inductor and to a drain of a second transistor. A source of the second transistor is coupled to ground through a resistor. A second terminal of the inductor is coupled to a first terminal of a capacitor. A second terminal of the capacitor is coupled to ground.

When the first transistor is turned on, the second transistor is turned off and the voltage supply is applied to the first terminal of the inductor, causing current in the inductor to increase in amplitude. The current flowing through the inductor simultaneously charges the capacitor, and stores energy in the inductor as an increasing magnetic field strength. When the first transistor is turned off, the second transistor is turned on, and the energy stored in the magnetic field of the inductor is converted back into current. The energy stored in the magnetic field of the inductor continues to charge the capacitor until either the cycle is repeated or the energy stored in the inductor is depleted. The current through the capacitor C is a difference between the current through the inductor L and a current drawn by a load coupled to the output voltage Vout. Since $dV/dt = dI/C$, it can be seen that the capacitor C will act to smooth any resulting ripple in the output voltage Vout. The voltage across the capacitor is held constant for powering a load by controlling the first and second transistors in a feedback loop.

The inductor current is monitored and limited to prevent excessive current from damaging circuit elements. When the first transistor is off and the second transistor is on, a voltage across the resistor in series with the second transistor forms a signal that is representative of the inductor current. When the inductor current is higher than a first threshold at the start of a discharge cycle, the discharge cycle is extended until the inductor current falls below a second threshold, lower than the first threshold. Thus, the inductor current is hysteretically limited.

DETAILED DESCRIPTION OF THE PREFERRED EMBODIMENT

Figure 1:
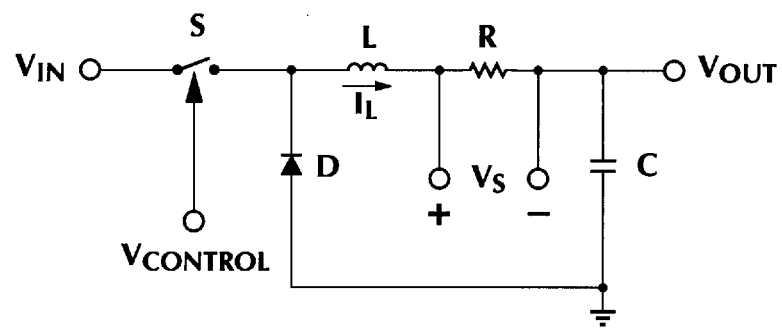
FIG. 1 illustrates a schematic diagram of a power stage of a DC-to-DC converter of the prior art.
Figure 2:
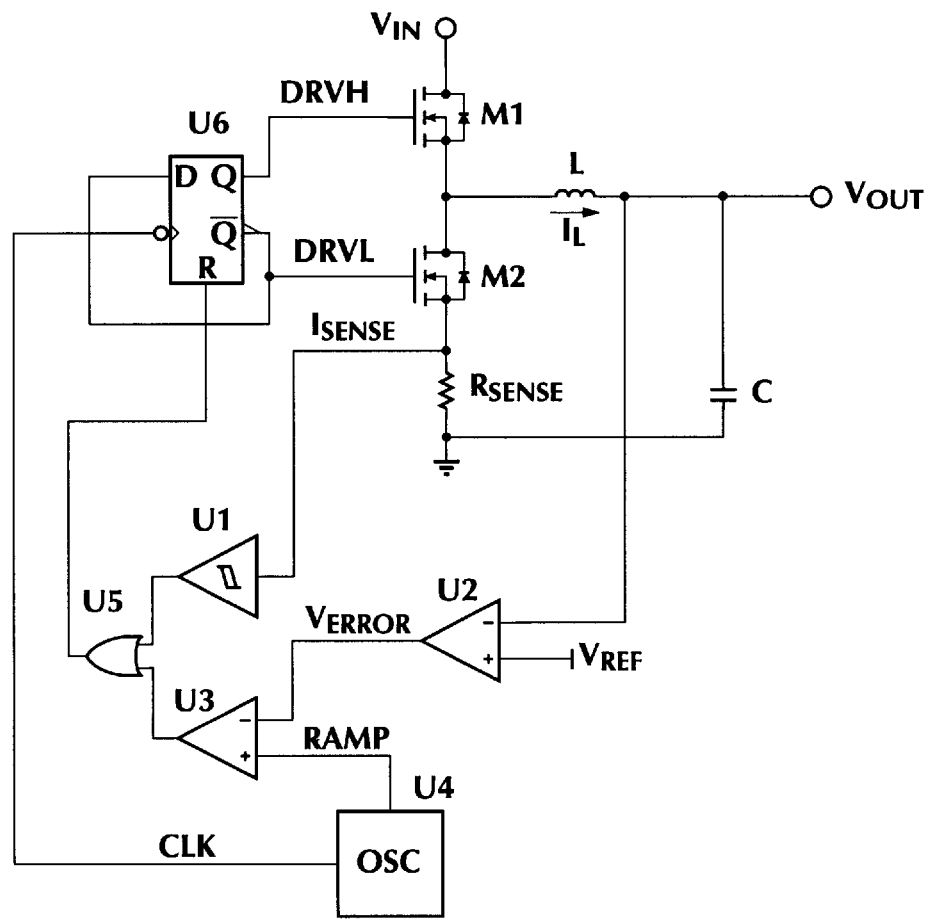
FIG. 2 illustrates a simplified schematic block diagram of a DC-to-DC converter of the present invention.

FIG. 2 illustrates a simplified schematic block diagram of a DC-to-DC converter of the present invention. A supply voltage Vin, such as a battery, is coupled to a drain of an NMOS transistor M1. A source of the transistor M1 is coupled to a first terminal of an inductor L and to a drain of an NMOS transistor M2. A source of the transistor M2 is coupled to a first terminal of a resistor Rsense and to an inverting input of a Schmitt trigger U1. A second terminal of the resistor Rsense is coupled to a ground node. A voltage across the resistor Rsense forms a signal Isense.

A second terminal of the inductor L is coupled to a first terminal of an output capacitor C and to a negative input to an amplifier U2. A second terminal of the capacitor C is coupled to the ground node. An output voltage Vout is formed across the capacitor C. A positive input to the amplifier U2 is coupled to a reference voltage Vref. An output of the amplifier U2 forms a signal Verror and is coupled to a negative input of a comparator U3.

A ramp output RAMP of an oscillator U4 is coupled to a positive input of the comparator U3. An output of the comparator U3 is coupled to a first input of an OR gate U5. An output of the Schmitt trigger U1 is coupled to a second input of the OR gate U5. An output of the OR gate U5 is coupled to a reset input R of a flip-flop U6. A clock output CLK of the oscillator U4 is coupled to a clock input CLK of the flip-flop U6. A Q output of the flip-flop U6 forms a signal DRVH and is coupled to a gate of the transistor M1. A $\overline{Q}$ output of the flip-flop U6 forms a signal DRVL and is coupled to a data input D of the flip-flop U6 and to a gate of the transistor M2.

The circuit illustrated in FIG. 2 operates as follows: When the transistor M1 is controlled by the signal DRVH to be on, the transistor M2 is controlled by the signal DRVL to be off, and when the transistor M1 is controlled by the signal DRVH to be off, the transistor M2 is controlled by the signal DRVL to be on. Thus, when the transistor M1 is turned on, the voltage supply is applied to the first terminal of the inductor L causing current in the inductor L to increase in amplitude. The current flowing through the inductor L simultaneously charges the capacitor C, and stores energy in the inductor L as an increasing magnetic field strength. When the transistor M1 is turned off, the transistor M2 is turned on, the energy stored in the magnetic field of the inductor L is converted back into current. The energy stored in the magnetic field of the inductor L continues to charge the capacitor C until either the cycle is repeated or the energy stored in the inductor L is depleted. The current through the capacitor C is a difference between the current through the inductor L and a current drawn by a load coupled to the output voltage Vout. Since $dV/dt=dI/C$, it can be seen that the capacitor C will act to smooth any resulting ripple in the output voltage Vout. By controlling the transistors M1 and M2, a constant output voltage Vout can be generated across the capacitor C for powering a load.

Figure 3:
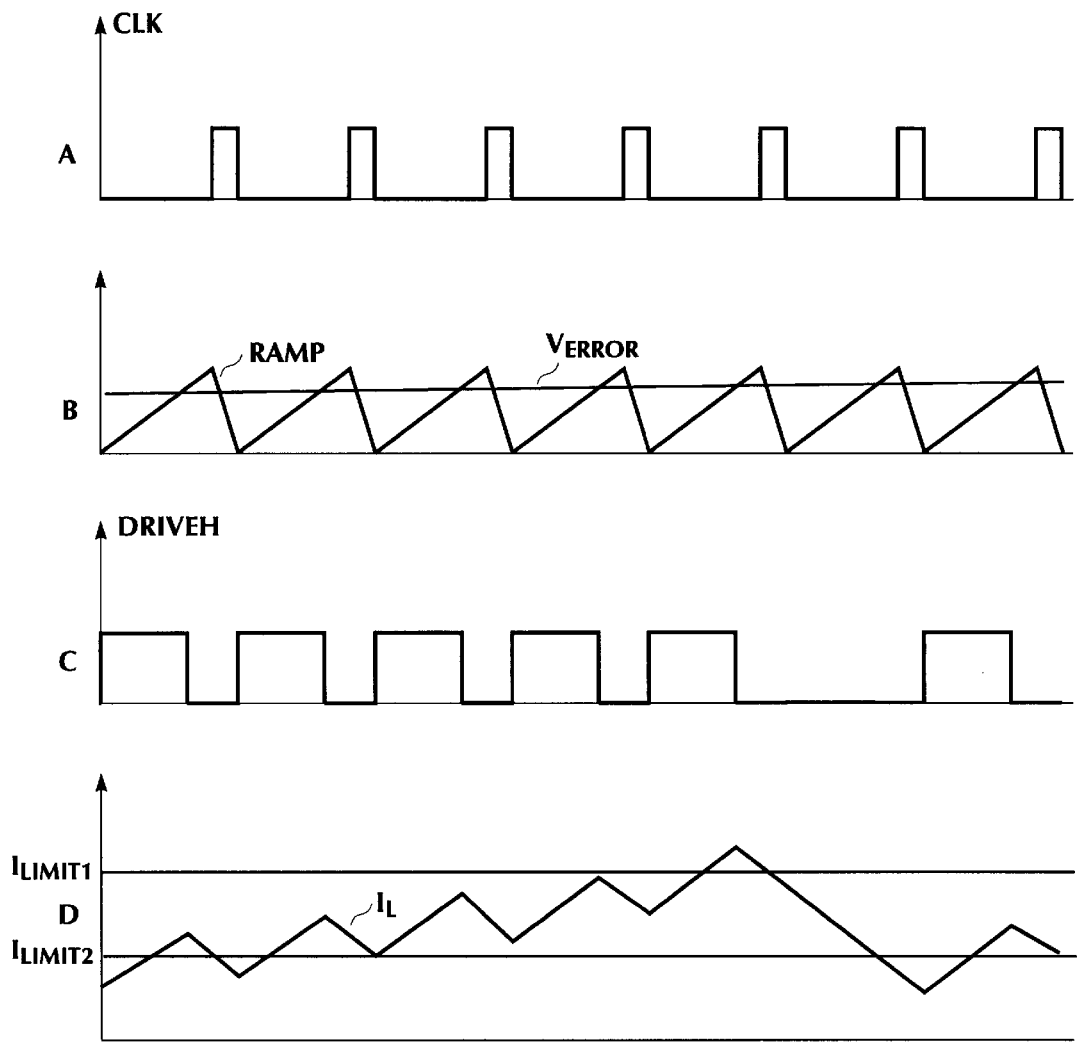
FIG. 3 illustrates waveforms for signals of the circuit of FIG. 2.

FIG. 3 illustrates waveforms for signals of the circuit of FIG. 2. The clock output CLK of the oscillator U4 is illustrated in FIG. 3A. The ramp output RAMP of the oscillator U4 is illustrated in FIG. 3B. A voltage representative of the output voltage Vout is compared to the reference voltage Vref, representative of a desired output voltage level, by the amplifier U2 for generating the signal Verror, as illustrated in FIG. 3B. The voltage representative of the output voltage Vout, can be the output voltage Vout, as illustrated in FIG. 2, or can be a voltage formed by a resistive divider coupled to the output node. Thus, the signal Verror is representative of a difference between the output voltage Vout and a desired output voltage.

FIG. 3C illustrates the signal DRVH, generated by the flip-flop U6, which controls the transistor M1. The signal DRVL is not shown because, as stated above, the signal DRVL is understood to be complementary to the signal DRVH. At each trailing edge of the clock signal CLK, the signal DRVH is set to a logical high voltage level which turns on the transistor M1. When the ramp output RAMP of the oscillator U4 exceeds the signal Verror, the output of the comparator U3 changes from a logical low voltage to a logical high voltage. This causes the output of the OR gate U6 to be a logical high voltage, resetting the flip-flop U6 such that the signal DRVH becomes a logical low voltage, turning off the transistor M1. At the next trailing edge of the clock signal CLK, the signal DRVH is set to a logical high voltage again, turning on the transistor M1, and the cycle repeats. Thus, the signal DRVH is pulse-width modulated according to a constant frequency.

FIG. 3D illustrates the current I1 through the inductor L. It is desired to monitor the current I1 to ensure that it does not become too large, as damage may result to components of the circuit, such as the transistor M1, the transistor M2 or the inductor L. When the transistor M1 is off and the transistor M2 is on, the inductor L is being discharged into the capacitor C. A current drawn through the resistor Rsense generates a negative voltage signal Isense that is representative of the current I1 in the inductor L. The voltage Isense is negative because current is drawn from ground through the resistor Rsense during the discharge cycle. For this reason, the signal Isense is coupled to a negative input to the Schmitt trigger U1.

The Schmitt trigger U1 has a hysteretic transfer characteristic such that the output of the Schmitt trigger U1 changes from a logical low voltage to a logical high voltage when the signal Isense becomes more negative than a first threshold. The output of the Schmitt trigger will change back to a logical low voltage when the signal Isense becomes less negative than a second threshold, where the first threshold is more negative than the second threshold.

For clarity, FIG. 3D shows the thresholds as having positive levels and shows the thresholds relative to the current I1. In FIG. 3D, the first threshold is represented relative to the current I1 by Ilimit1 and the second threshold is represented relative to the current I1 by Ilimit2. As can be seen from FIG. 3D, the threshold Ilimit2 is lower than the threshold Ilimit1. As will be apparent, the level of the threshold Ilimit1 and the threshold Ilimit2 are selectively controllable by adjusting parameters of the Schmitt trigger U1.

At the start of a discharge cycle, if the current I1 through the inductor L, as sensed by the signal Isense, has exceeds the first threshold Ilimit1, the output of the Schmitt trigger U1 becomes a logical high voltage causing the output of the OR gate U5 to be a logical high voltage. Thus, at a next trailing edge of the clock signal CLK, the reset R input of the flip-flop U6 is at a logical high voltage, holding the Q output at logical low voltage and holding the transistor M1 off. This occurrence is illustrated in FIG. 3 where it can be seen that after the current I1 exceeds the first threshold Ilimit1, the signal DRVH remains low after the next trailing edge of the clock signal until the current I1 passes below the second threshold Ilimit2. Then, at a next trailing edge of the clock signal, the signal DRVH becomes a logical high voltage, turning the transistor M1 on again.

During a charge cycle, when the transistor M2 is off, the voltage across the resistor Rsense is no longer representative of the current I1. Also, the output of the Schmitt trigger U1 will be a logical low voltage because the input of the Schmitt trigger will be close to zero volts. Thus, according to the invention, the current I1 in the inductor L is monitored only during the discharge cycles, rather than at all times, as in the prior art. During the charge cycles, the transistor M2 is off. Therefore, during the charge cycles, no power is dissipated in the resistor Rsense. Thus, the present invention saves power over the prior art.

Figure 4:
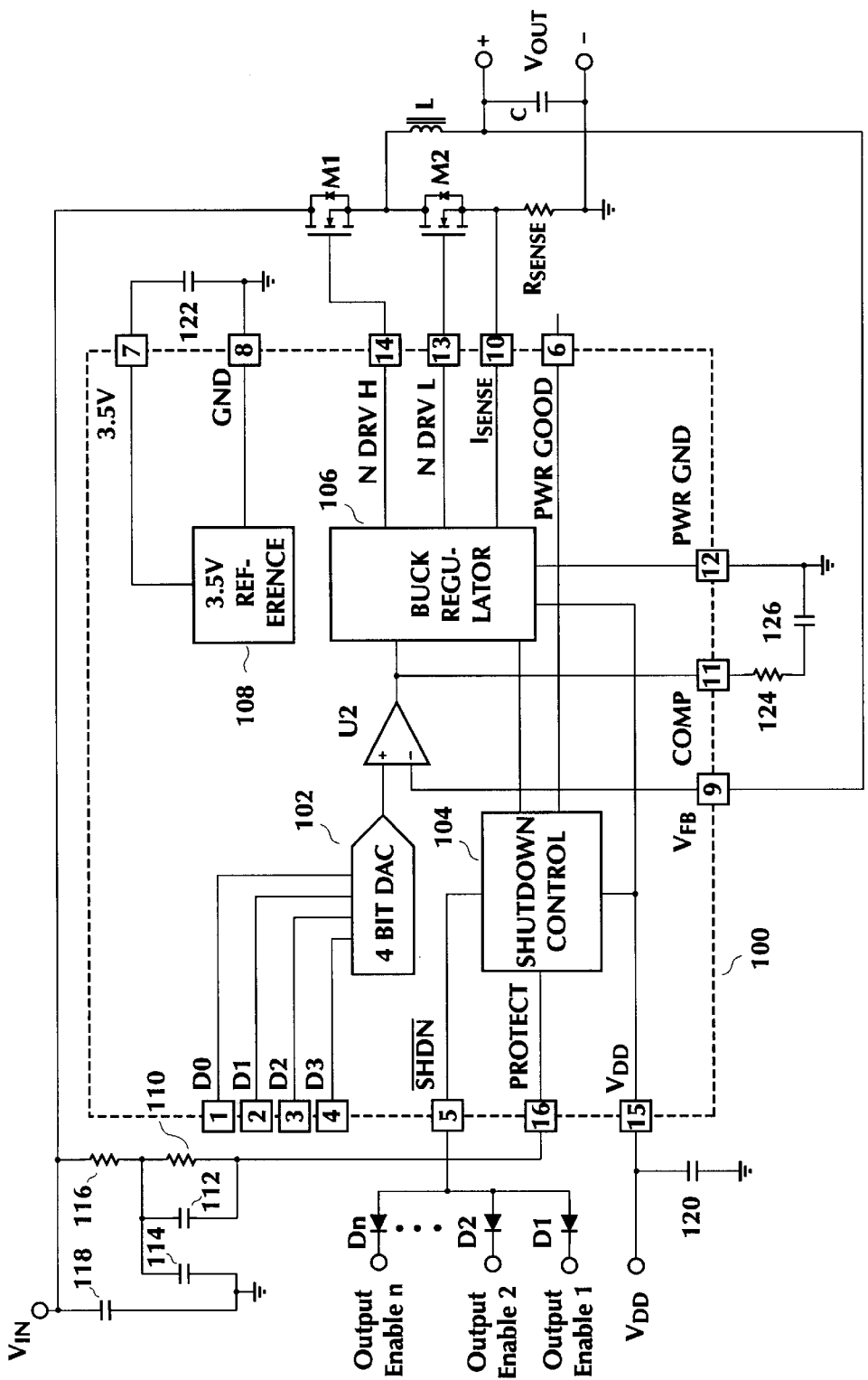
FIG. 4 illustrates a simplified schematic block diagram of an integrated circuit DC-to-DC converter controller and power stage of the present invention.

FIG. 4 illustrates a simplified schematic block diagram of an integrated circuit DC-to-DC converter controller and power stage of the present invention. The integrated circuit 100 shown enclosed by dotted lines is available under part number ML4900 from Micro Linear Corporation, located at 2092 Concourse Drive in San Jose, Calif. The integrated circuit 100, includes pins 1–16. Referring to portions of the diagram internal to the integrated circuit 100, pins 1–4 are coupled to four inputs of a 4-bit digital-to-analog converter 102. An output of the digital-to-analog converter 102 forms the reference voltage Vref and is coupled to a positive input to an amplifier U2 (corresponding to the amplifier U2 of FIG. 2).

Pins 5, 6 and 16 are coupled to a shutdown control circuit 104. Pin 15 is coupled to the shutdown control circuit and to a buck regulator circuit 106. The shutdown control circuit 104 disables the output of the regulator and isolates the output of the regulator from the input supply Vin. Pin 8 is coupled to a ground of a reference voltage circuit 108. Pin 7 is coupled to reference voltage level of the reference voltage circuit 108. Pin 14 is coupled to a DRVH output of the buck regulator circuit 106. Pin 13 is coupled to a DRVL output of the buck regulator circuit 106. Pin 10 is coupled to an Isense input of the buck regulator circuit 106. Pin 12 is coupled to a ground of the buck regulator circuit 106. Pin 11 is coupled to an output of the amplifier U2 and to a voltage error input to the buck regulator 106.

Referring to portions of FIG. 4 that are external to the integrated circuit 100, Pins 1–4 are coupled to receive a 4 bit digital signal representative of a desired level for the output voltage Vout. Pin 5 is coupled to an anode of each of diodes D1–Dn. A cathode of each of the diodes D1–Dn is coupled to receive a corresponding external OUTPUT ENABLE signal for enabling/disabling the output of the DC-to-DC converter. This allows a number of external circuits equal to the number n to enable/disable to the output of the DC-to-DC converter. Pin 16 is coupled to a first terminal of a resistor 110 and to a first terminal of a capacitor 112. A second terminal of the resistor 110 is coupled to a second terminal of the capacitor 112, to a first terminal of capacitor 114 and to a first terminal of a resistor 116. A second terminal of the capacitor 114 is coupled to ground. A second terminal of the resistor 116 is coupled to a first terminal of a capacitor 118, to a Vin terminal and to a drain of the transistor M1. A second terminal of the capacitor 118 is coupled to ground.

Pin 15 is coupled to a first terminal of a capacitor 120 and to a VDD terminal. A second terminal of the capacitor 120 is coupled to ground. Pin 8 is coupled to a first terminal of a capacitor 122 and to ground. Pin 7 is coupled to a second terminal of the capacitor 122. Pin 14 is coupled to a gate of the transistor M1. Pin 13 is coupled to a gate of the transistor M2. A source of the transistor M1 is coupled to a drain of the transistor M2 and to a first terminal of the inductor L. A second terminal if the inductor L is coupled to Pin 9 and to a first terminal of the capacitor C. A second terminal of the capacitor C is coupled to the ground node. The output voltage Vout is formed across the capacitor C.

Pin 10 is coupled to a source of the transistor M2 and to a first terminal of the resistor Rsense. A second terminal of the resistor Rsense is coupled to the ground node. Pin 12 is coupled to ground. Pin 11 is coupled to a first terminal of a resistor 124. A second terminal of the resistor 124 is coupled to a first terminal of a capacitor 126. A second terminal of the capacitor 126 is coupled to the ground node.

Figure 5A:
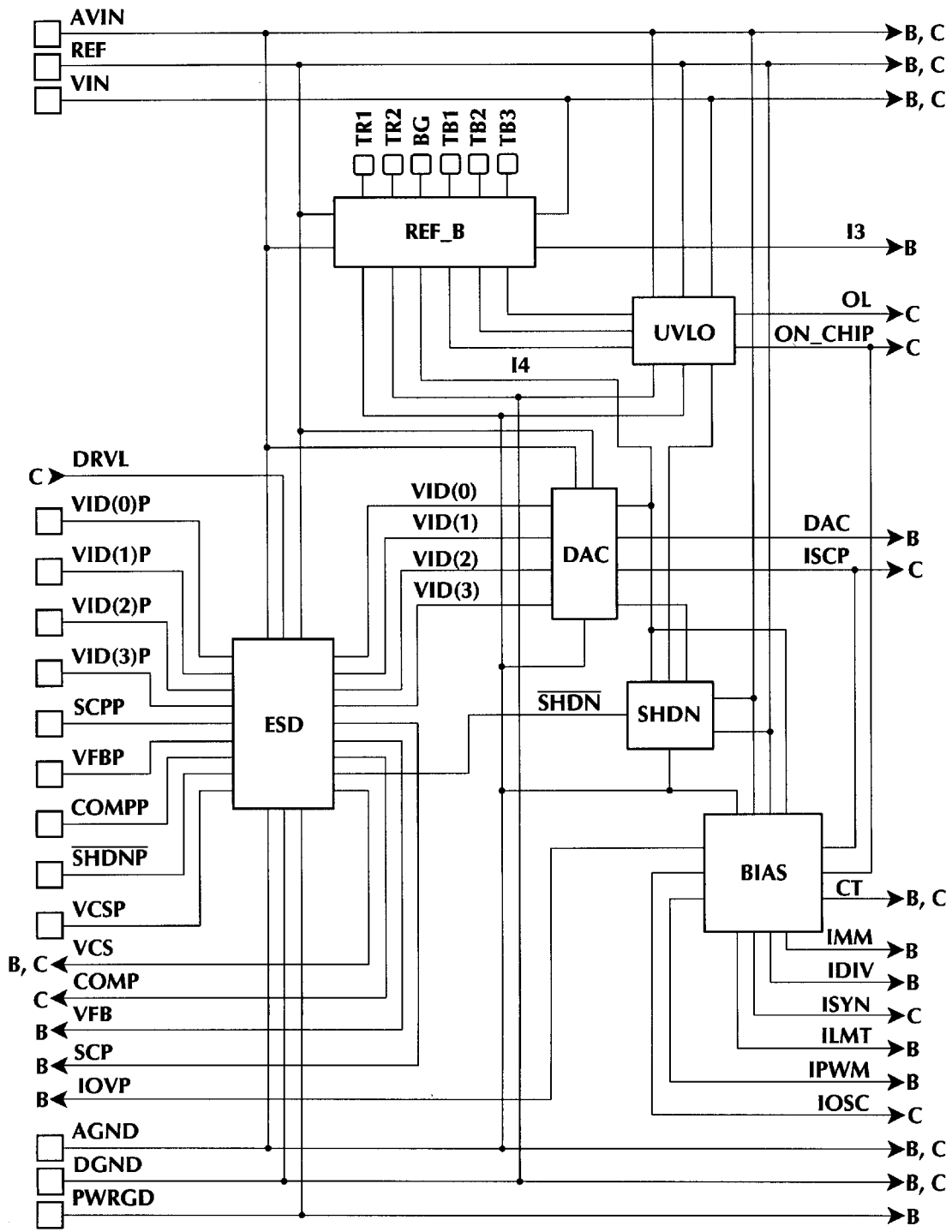
FIG. 5 illustrates a detailed schematic diagram of the integrated circuit DC-to-DC controller of the present invention.
Figure 5B:
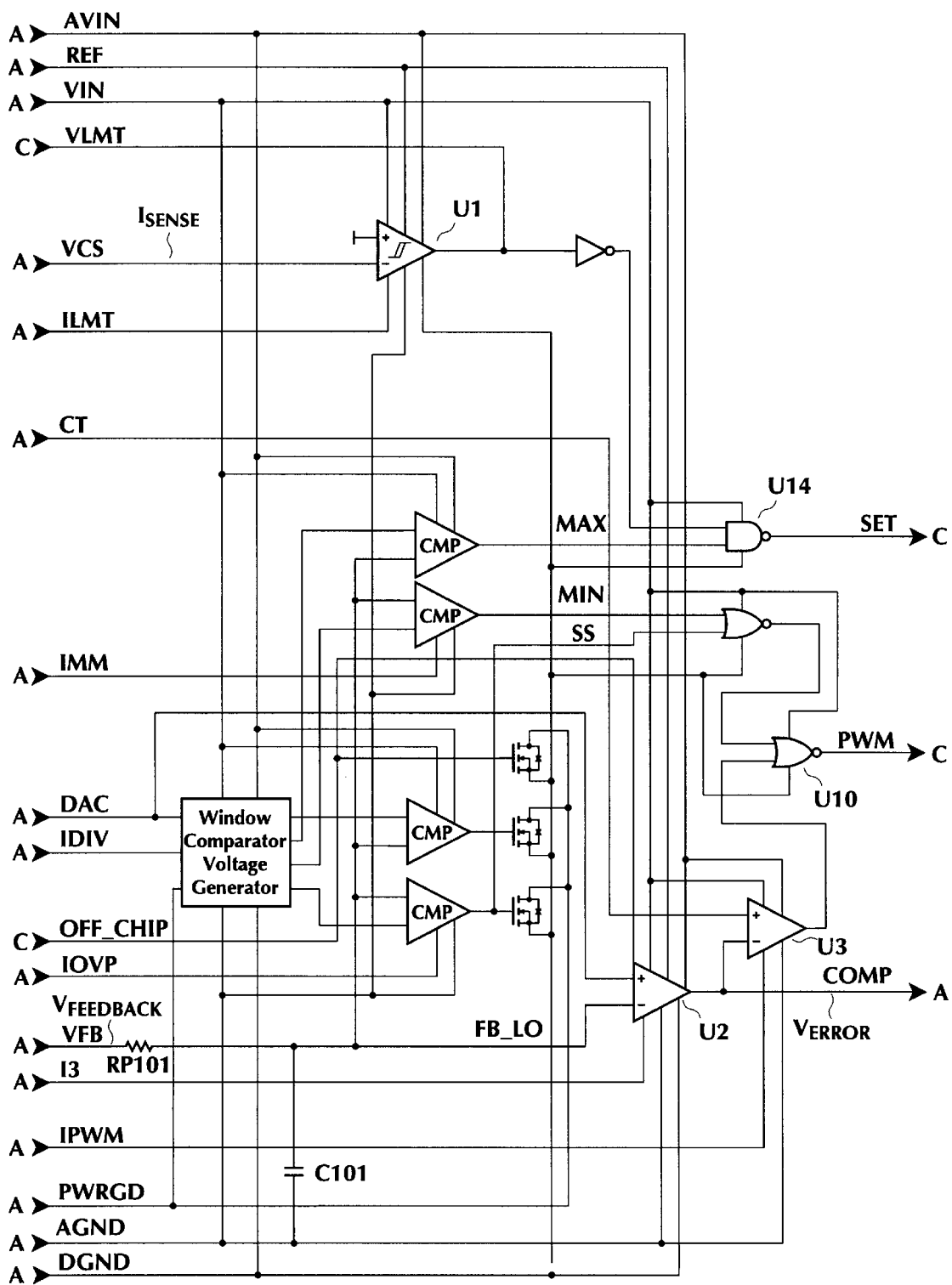
Figure 5C:
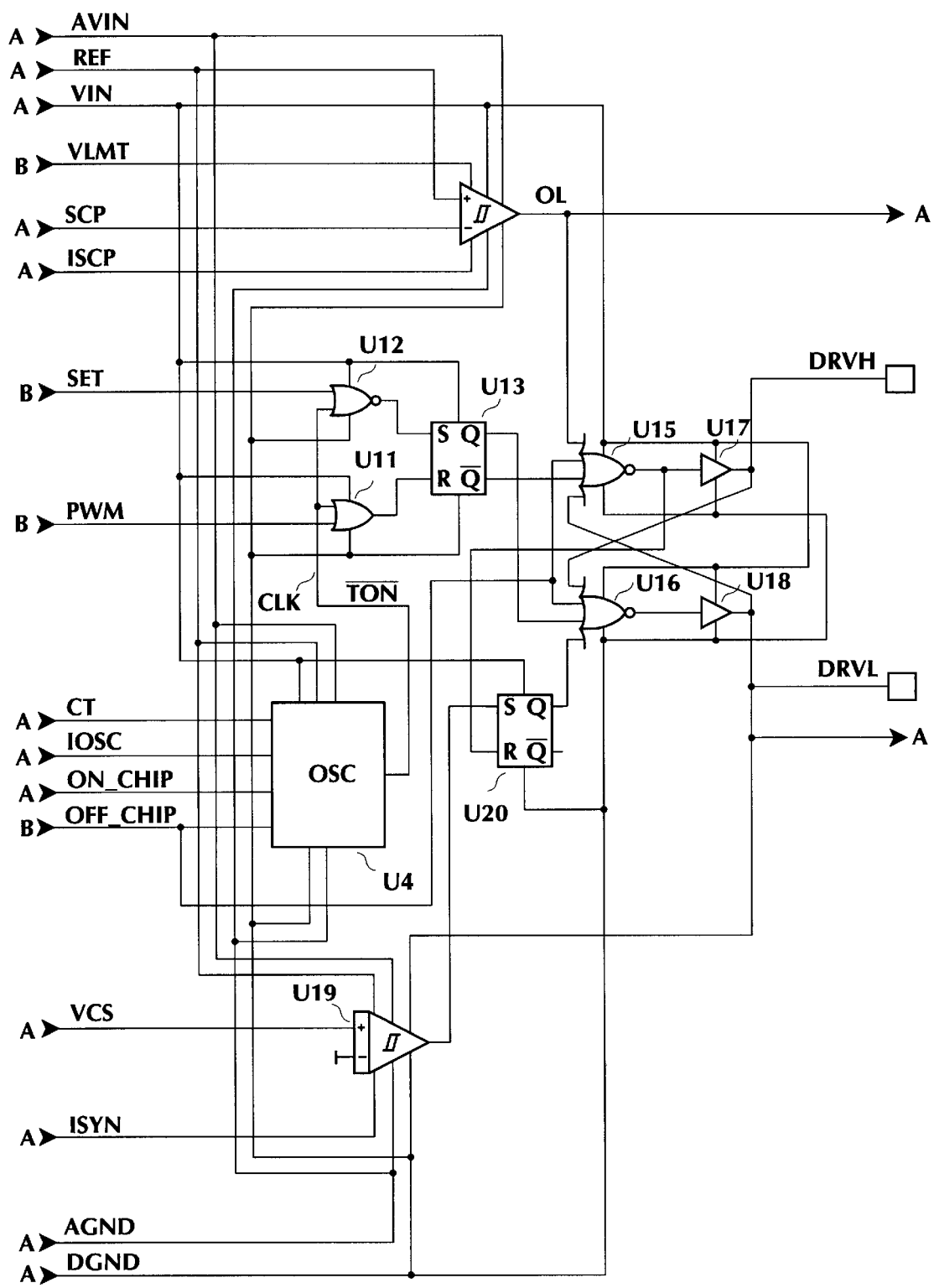

FIG. 5 illustrates a detailed schematic diagram of the integrated circuit DC-to-DC controller of the present invention. Elements of FIG. 5 corresponding to elements of FIG. 2 and FIG. 4 are labelled with corresponding reference characters. In FIG. 5, the signal Vfeedback is coupled to the negative input of the amplifier U2. The reference voltage Vref, generated by the digital-to-analog converter 102, is coupled to the positive input of the amplifier U2. The output of the amplifier U2 forms the signal Verror and is coupled to the negative input terminal of the comparator U3. The oscillator U4 forms the signal RAMP which is coupled to the positive input of the comparator U3. The oscillator U4 also forms the clock signal CLK. In FIG. 5, the signal Isense is coupled to a negative input of the Schmitt trigger U1.

In FIG. 5, logic circuits including the elements U10, U11, U12, U13, U14, U15, U16, U17 and U18 perform the functions of the OR gate U5 and the flop-flop U6 of FIG. 2 for forming the signals DRVH and DRVL. Preferably, the flip-flop U6 of FIG. 2 and its corresponding elements of FIG. 5 have a break-before-make function which prevents the transistors M1 and M2 from both being momentarily turned on during switching. In addition, the transistors M1 and M2 preferably have a high power dissipation abilities for supplying sufficient power to a load coupled across the output capacitor C. In FIG. 5, the comparator U19 and flip-flop U20 can be omitted, with the NOR gate U16 having three, rather than four inputs.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein. It will be apparent that transistors of one type, such as NMOS, PMOS, bipolar pnp or bipolar npn can be interchanged with a transistor of another type, and in some cases interchanged with diodes, with appropriate modifications of the remaining circuitry, and so forth.

What is claimed is:

1. A DC-to-DC converter comprising:

a. means for charging an inductor with a current;

b. means for discharging the inductor into a capacitor, the means for discharging coupled to the means for charging; and c. means for sensing a level of current in the inductor only when discharging the inductor, the means for sensing coupled to the means for discharging.

2. The DC-to-DC converter according to claim 1 further comprising means for sensing a voltage level across the capacitor.

3. The DC-to-DC converter according to claim 2 wherein the means for charging and the means for discharging are alternately activated according to a pulse width modulation scheme for maintaining the voltage level across the capacitor at a predetermined level.

4. The DC-to-DC converter according to claim 3 further comprising means for inhibiting coupled to the means for sensing for inhibiting the means for charging when the level of the current in the inductor exceeds a first threshold.

5. The DC-to-DC converter according to claim 4 wherein the means for inhibiting ceases inhibiting the means for charging after the level of the current in the inductor drops below a second threshold and wherein the first threshold is higher than the second threshold.

6. The DC-to-DC converter according to claim 5 wherein the means for inhibiting ceases inhibiting the means for charging according to a clock signal after the level of current falls below the second threshold.

7. A method of sensing current in a DC-to-DC converter comprising the steps of:

a. charging an inductor;

b. discharging the inductor; and c. sensing a level of current in the inductor only when discharging the inductor.

8. The method according to claim 7 wherein the step of charging and the step of discharging are performed alternately for charging a capacitor coupled to the inductor.

9. The method according to claim 8 further comprising the step of sensing a voltage across the capacitor and wherein the step of charging has a first period and the step of discharging has a second period wherein the first period and the second period have a combined period that is constant and further wherein the first period and the second period are modulated for maintaining the voltage substantially constant.

10. The method according to claim 8 further comprising a step of sensing a voltage across the capacitor wherein the step of charging has a first period and the step of discharging has a second period and wherein the first period and the second period are modulated for maintaining the voltage substantially constant and wherein the first period and the second period have a combined period that is constant except when the level of current exceeds a first threshold, and wherein after the level of current exceeds the first threshold during the first period, the second period is extended until after the level of current falls below a second threshold and wherein the second threshold is lower than the first threshold.

11. The method according to claim 10 wherein the first period begins according to a clock signal after the level of current falls below the second threshold.

12. A DC-to-DC converter comprising:
   a. a first transistor having a first drain, a first source and a first gate;
   b. a second transistor having a second drain, a second source and a second gate, wherein the second drain is coupled to the first source;
   c. means for controlling the first gate and the second gate coupled to the first gate and to the second gate;
   d. an inductor having a first terminal and a second terminal wherein the first terminal of the inductor is coupled to the first source;
   e. a capacitor having a first terminal and a second terminal wherein the first terminal of the capacitor is coupled to the second terminal of the inductor; and
   f. a resistor having a first terminal and a second terminal wherein the first terminal of the resistor is coupled to the second source and wherein the second terminal of the resistor is coupled to a supply potential.

13. The DC-to-DC converter according to claim 12 further comprising means for sensing a voltage across the resistor for forming a current sense signal wherein the current sense signal is representative of a current in the inductor only when the second transistor is on.

14. The DC-to-DC converter according to claim 13 wherein after the current sense signal passes a first threshold, the means for controlling controls the second gate such that the second transistor stays on until after the current sense signal passes a second threshold.

15. The DC-to-DC converter according to claim 14 wherein the first threshold and the second threshold are below a lowest available supply potential and wherein the first threshold is more negative than the second threshold.

16. The DC-to-DC converter according to claim 15 wherein the lowest available supply potential is at ground level.

17. The DC-to-DC converter according to claim 13 further comprising means for sensing a voltage across the capacitor for forming a voltage sense signal wherein the means for controlling controls the first gate and the second gate according to the voltage sense signal for maintaining the voltage across the capacitor substantially constant.

18. The DC-to-DC converter according to claim 17 wherein the first gate and the second gate are controlled according to a constant frequency pulse width modulation scheme.

19. The DC-to-DC converter according to claim 17 further comprising a digital-to-analog converter for selectively controlling the voltage across the capacitor.

20. A DC-to-DC converter controller comprising:
   a. means for charging an inductor with a current;
   b. means for discharging the inductor into a capacitor for forming a first voltage across the capacitor;
   c. means for sensing a current in the inductor; and
   d. means for sensing the first voltage, wherein the inductor is charged and discharged according to a pulse-width modulation scheme for maintaining the first voltage substantially constant and wherein, after the current in the inductor exceeds a first threshold, the inductor is discharged until after the current in the inductor falls below a second threshold lower than the first threshold.

21. The DC-to-DC converter controller according to claim 20 wherein the means for sensing the current in the inductor only senses the current in the inductor when the inductor is discharging.

22. The DC-to-DC converter controller according to claim 20 wherein, after the current in the inductor exceeds the first threshold, the inductor is charged according to a next clock signal occurring after the current in the inductor falls below the second threshold.

23. The DC-to-DC converter controller according to claim 20 wherein a second voltage is representative of the current in the inductor and wherein the second voltage is below the lowest available supply potential when the inductor is discharging.

24. A DC-to-DC converter comprising:
   a. a first transistor having a first drain, a first source and a first gate wherein the first drain is coupled to receive power from a supply;
   b. a second transistor having a second drain, a second source and a second gate wherein the second drain is coupled to the first source;
   c. a resistor having a first terminal and a second terminal wherein the first terminal of the resistor is coupled to the second source and wherein the second terminal of the resistor is coupled to a ground node;
   d. an inductor having a first terminal and a second terminal wherein the first terminal of the inductor is coupled to the first source and to the second drain;
   e. a capacitor having a first terminal and a second terminal wherein the first terminal of the capacitor is coupled to the second terminal of the inductor and wherein the second terminal of the capacitor is coupled to the ground node;
   f. an amplifier having a positive input, a negative input and an output wherein the positive input of the amplifier is coupled to a reference voltage source and wherein the negative input of the amplifier is coupled to the first capacitor terminal;
   g. a comparator having a positive input, a negative input and an output wherein the negative input is coupled to the output of the amplifier;
   h. an oscillator having a periodic ramp output wherein the periodic ramp output is coupled to the positive input of the comparator;

i. a Schmitt trigger having an hysteretic transfer characteristic and having an input and an output wherein the input is coupled to the first terminal of the resistor; and j. logic circuits coupled to receive the output of the comparator and the output of the Schmitt trigger for forming a first output signal and a second output signal wherein the first output signal is coupled to the first gate and the second output signal is coupled to the second gate.

25. The DC-to-DC converter according to claim 24 wherein a voltage across the capacitor is maintained substantially constant.

26. The DC-to-DC converter according to claim 25 wherein after a current in the inductor exceeds a first threshold, the current in the inductor is allowed to fall below a second threshold before the current in the inductor is increased and wherein the second threshold is lower than the first threshold.

27. The DC-to-DC converter according to claim 25 wherein a frequency of the periodic ramp signal is essentially constant when the Schmitt trigger is not responding to an over-current condition.

* * * * *

UNITED STATES PATENT AND TRADEMARK OFFICE
CERTIFICATE OF CORRECTION

PATENT NO. : 5,808,455

DATED : September 15, 1998

INVENTOR(S) : Schwartz et al.

It is certified that error appears in the above-identified patent and that said Letters Patent is hereby correct as shown below: On the title page: Item [56]

IN THE REFERENCES CITED:

Insert --4,311,954   1/1982   Capel   323/222--.

Signed and Sealed this

Fifteenth Day of December, 1998

Attest:

BRUCE LEHMAN

Attesting Officer  Commissioner of Patents and Trademarks